United States Patent Office
3,476,583
Patented Nov. 4, 1969

3,476,583
METHOD FOR RENDERING FIBROUS MATERIAL OIL AND WATER REPELLENT
Vincent Theodore Elkind, Metuchen, Joseph Aloyus Yurko, Bayonne, and Robert Tweedy Hunter, Piscataway, N.J., assignors to Colgate-Palmolive Company, New York, N.Y., a corporation of Delaware
No Drawing. Filed Oct. 30, 1967, Ser. No. 679,196
Int. Cl. B44d 1/44
U.S. Cl. 117—63        10 Claims

ABSTRACT OF THE DISCLOSURE

This invention relates to a method and means for achieving a degree of oil and/or water repellency in fibrous materials by treating such materials as textiles and the like with a fluorocarbon polymer and achieving the desired oil and/or water repellency by activation with a curing solvent, such as unsymmetrical trichlorotrifluoroethane, and wherein the solvent has incorporated therein an adjuvant for the solvent to thereby increase the curing activity thereof.

---

It is known that textile materials can be made water resistant and oil repellent by treating them with aqueous solutions or dispersions of organic compounds which contain a plurality of perfluoroalkyl radicals. After such treatment, in the past, it has been necessary to activate the oil and water resistant properties by curing techniques such as oven or hot iron treatment. It will be appreciated that oven techniques cannot readily be utilized in conjunction with textile materials in the home. While ironing techniques, on the other hand, may be easily utilized in the home, the ironing of pile type material or already applied fibrous wall paper is virtually impossible. A technique avoiding the prior art cure methods would be appreciated as giving wider usage to the use of fluorocarbon polymer compounds in establishing a degree of water and oil repellency for various materials. While some progress has already been accomplished in this direction by employing fluorocarbon polymers which have been activated with a solvent therefor, the effectiveness has not been deemed as good as desired.

Accordingly, the present invention relates to a method for developing oil and water repellency in fibrous materials, such as textile materials, comprising treating such materials with a fluorocarbon polymer in water, for instance; then drying said treated materials; thereafter treating the materials to an activation and curing composition to achieve the water and oil repellency benefits of the fluorocarbon polymer. The composition comprises a solvent for the fluorocarbon polymer and a material which retards the evaporation of the solvent whereby better curing is effected.

The fluorochemical compounds, which are used to impart water and oil repellent properties, can have chemical structures that vary widely. For example, acrylates and methacrylate of hydroxyl compounds containing a highly fluorinated residue and their polymers and copolymers can be used. Fluorochemical compounds of this type are defined with greater particularity in U.S. Patent Nos. 2,642,416, 2,826,565, 2,829,513 and 2,803,615. Other fluorochemical compounds which can be employed as oil and water repellent agents include the chromium coordination complexes of saturated perfluoromonocarboxylic acids of which the chromium complexes perfluorobutyric acid and perfluorooctanoic acid are representative. Fluorochemical compounds suitable for the process of the invention are available commercially, many of which have been patented and assigned to the Minnesota Mining and Manufacturing Company, for example those having the following formula:

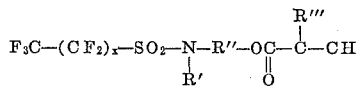

where X is an integer in the range of 3–13, R' is methyl, ethyl, propyl, butyl, amyl, hexyl, R" is an alkylene radical having 1–12 carbon atoms and R''' is hydrogen, methyl or ethyl. Other applicable fluorochemical compounds are compounds manufactured by DuPont, such as polymers of 1,1,7-trihydroperfluoroheptyl acrylate; 1,1,7-trihydroperfluoroheptyl methacrylate; 1,1-dihydroperfluorooctyl methacrylate and a terpolymer latex product consisting of 97.6% perfluoromethacrylate monomer, 2% butyl acrylate and 0.5% N-methylol acrylamide.

The applicable activation solvent may be one or more of the following solvents: unsymmetrical trichlorotrifluoroethane, 1,3 hexafluoroxylene, trifluorotoluene and tetrahydrofuran with an additive such as an aromatic alcohol ether, aromatic ester and/or aliphatic ester, such as terpeneol, phenylethanol, amyl salicylate, benzyl acetate and essential oils. While it is not specifically known as to how the additive functions to enhance activation of the curing solvent, it is believed that solvent evaporation is retarded so that curing may be effected for a longer period of time after application to the substrate.

The techniques attendant the present invention may be utilized in conjunction with fibrous, porous and continuous surfaces. Illustrative articles to be treated are textiles, glass, paper, wood, leather, fur, asbestos, bricks, concrete, metals, ceramics, plastics, painted surfaces and plaster. Due to the advantages incident to the repellency to oil and water and their resistance to soiling imparted by carrying out the techniques of the present invention; the preferred classes of articles to be treated are textile apparel, upholstery, draperies, carpeting, paper bags, cardboard containers, luggage, handbags, shoes, jackets, redwood, pine cedar and asbestos siding materials, bricks, concrete, floor or wall tiles, painted or unpainted metals such as appliances and automobile bodies, masonry, wood plaster, wallpaper and wallboard surfaces. In the treatment of fabrics 0.05 to 5% (preferably 0.1 to 1%) by weight of the fluorocarbon polymer on the weight of the fabric produces desirable surface properties. Illustrative textiles which can be advantageously treated with the fluorocarbon polymer are those based on natural fibers, e.g., cotton, wool, mohair, linen, jute, silk, ramie, sisal, kenaf, etc., and those based on synthetic fibers, e.g., rayon, acetate, acrylic, polyester, saran, azylon, nytril, nylon, spandex, vinyl, olefin, vinyon and glass fibers. (These designations of synthetic fibers are the generic terms set up by the Federal Trade Commission.) The treatment of these fabrics with the compositions of this invention imparts no adverse effect to the hand of the fabric and in some cases has a softening effect, thereby improving the hand.

The fluorocarbon polymer may be applied as a surface treatment by known methods of coating such as spraying, brushing, or impregnation from an aqueous or organic solvent dispersion or an organic solution of the fluorocarbon polymer. The fluorocarbon polymer may be used as the sole component in the treating vehicle or as a component in a complex multi-ingredient formulation.

The amount of the fluorocarbon polymer used in the impregnating solution may be varied within wide limits, depending on the type of substrate employed and on the end use requirements for water repellency, oil repellency and durability. The following ranges are preferred, and give excellent results on many types of substrates, such as fabrics:

(a) 1% to 5% of an aqueous dispersion of the fluorocarbon polymer compound (about 30% active ingredient).

(b) Surfactant may vary from 0–6%.

The activation composition is applied by employing one of numerous methods. For instance the solvent-additive composition may be applied by brushing or spraying the previously fluorocarbon polymer treated polymer substrate with the composition. While the substrate, if possible, may be immersed in a bath containing the composition, it will be appreciated that the adjuvant is primarily effective as a solvent retardant when the substrate has been removed from the bath. Therefore, the use of the adjuvant finds its greatest applicability under those conditions where the curing solvent is applied as a coating to the substrate as by brushing or spraying.

In the activating composition, the following quantities are applicable:

(a) Small but effective amount—to wetness of the substrate of the selective curing solvent;

(b) A small but perceptible amount of the additive—to about 5% of the weight of the selective curing solvent.

The following specific examples will further illustrate the practice of the invention, but are not to be deemed to limit the scope of the invention to any procedural or other details there set forth.

EXAMPLE I

Cotton swatches having 80×80 count were treated in an aqueous medium containing polyperfluoroalkyl methacrylate and surfactant, namely, N-hydrogenated tallow N, N diisopropanol N-methyl methyl sulfate. The quantity of the polyperfluoroalkyl methacrylate in the aqueous medium was such so as to deposit 0.25% by weight of the weight of fabric and similarly, the surfactant was in a quantity of 0.33% by weight of the fabric. The medium was acidified with acetic acid to a pH of 5.

After exhausting the fluorocarbon polymer on the swatches, the swatches were removed from the treating medium and air dried at room temperature. The thereby treated specimens had a fair water repellency.

One group of swatches was then brushed with Freon 113 (unsymmetrical trichlorotrifluoroethane). The swatches so treated developed a better repellency than those not given a solvent curing treatment. The remaining group of swatches was then brushed with Freon 113 (unsymmetrical trichlorotrifluoroethane) containing 1% terpeneol. These swatches were then dried at room temperature. These swatches developed the best repellency.

EXAMPLE II

This example illustrates the further concept of treating fabrics in a mill with the fluorocarbon polymer followed by drying and activation by application of the selective curing agent composition of the present invention. Illustratively, rolls of cotton were run through a padder where the cotton was treated to an 80% wet pick-up of a formulation comprising 3.5% by weight of a polymer of 1,1,7-trihydroperfluoroheptyl acrylate, and 0.35% nonyl phenoxypolyoxyethylene ethanol nonionic surfactant, the remainder being water. Then the roll of wet cotton was passed through an oven at 250° F. where it was dried for five minutes. The cotton was then cooled to room temperature. Thereafter, the cotton was conveyed to a chamber wherein it was sprayed with 1,3-hexafluoroxylene containing 2% terpeneol. From the chamber, the roll of cotton is passed into a sealed compartment, where the vapor of the selective solvent was efficiently recovered. The cotton so treated exhibited a high degree of water and oil repellency.

Several tests can be employed to establish the effectiveness of the present process for imparting water repellent and oil-repellent properties to the various substrates.

While a number of tests have been devised to determine the degree of stain resistance of fabrics and the subsequent launderability thereof, many of the tests fail by reason of the difficulty of making such tests consistently reproducible. Colgate-Palmolive research scientists have developed an ingenious test system which overcomes the shortcomings of the previous tests. Essentially, their method consists of placing onto the fabric measured volumes of standard common staining materials and comparing the size and intensity to a visual standard. In this way a semi-quantitative estimation of the staining characteristics of a given fabric is obtained.

The test technique employs three water borne stains, namely, (1) chocolate milk, (2) black coffee and (3) imitation "Coke"; and three oil borne stains, namely, (4) blue dyed corn oil, (5) French dressing and (6) blue dyed petroleum oil.

The staining materials mentioned in the above have the following compositions:

(1) Chocolate milk stain

| | Cc. |
|---|---|
| Evaporated milk | 80 |
| Corn syrup | 20 |
| Chocolate syrup | 20 |
| Water | 60 |

This stain should be prepared once a week and kept refrigerated.

(2) Black coffee

| | G. |
|---|---|
| Instant coffee | 1.5 |
| Boiling water | 98.5 |

The coffee solution is allowed to cool until it reaches 70–80° F. The stain should not be kept for more than eight hours. The coffee stain should be freshly prepared on a daily basis.

(3) Imitation "Coke"

| | Cc. |
|---|---|
| "Coke" syrup | 50 |
| Isopropanol | 50 |
| Water | 100 |

(4) Blued dyed corn oil 0.40 g. blue dye is added to 400 g. corn oil with stirring and heat in order to obtain a uniform solution.

(5) French dressing

Once a bottle is opened, it should be stored in a refrigerator.

(6) Blue dyed petroleum oil 250 grams of oil are mixed with 0.1% blue dye by weight of the oil. The mixture is agitated and warmed in order to obtain a uniform solution.

The test in the instant case is a static stain repellency test in that the fabric surface is given a minimum disturbance.

In application the temperature of the stain materials is between 70–80° F. A piece of white fabric approximately 7 inches by 7 inches is placed on blotting paper on a hard surface. 1½ cc. of each test stain is carefully placed (not dropped) in separate areas on the fabric. After two minutes, the excess stain material, if any, is removed using a vacuum suction line without coming in physical contact with the stained surface. The stained area is brushed twice lightly in opposite directions with a straight motion of a dry absorbent tissue to remove any unabsorbed stain material.

The stains are rated against the white background of a clean blotter. Ratings of 1 through 5 are arrived at strictly on size (relative spread) of an individual stain while rating 6 through 10 determines relative wetting as measured by intensity of the stain against a standard.

In other words, a stain not even wetting the fabric could not change the color of the fabric and would have been completely removed from the surface thereof. The rating, therefore would be 10. With increasing wetting of the area to which the stain has been applied there would be a greater color intensity therefore a lower rating until 6 is reached, whereupon, if the stain has migrated from its original boundary then one can assume complete wetting of the original area so that degree of migration becomes the determining factor. The greater the migration, the lower the number given. It will be appreciated that the test system is based on relative values, and yet provides unique reproducible valid results.

The three water borne stains are added together to give a possible maximum of 30. Likewise the oil borne stains are added to give a maximum possibility of 30. These may then be totalled for a maximum of 60.

To arrive at the launderability portion of the test, the stained fabrics are dried 24 hours. Laundering is then carried out by washing in an automatic washer with a quantity of a conventional detergent. The fabrics are then dried in an automatic dryer at the appropriate setting for the fabric type. They are then lightly dry ironed (stain side down) at the appropriate fabric setting.

The rating of launderability of stains is based on the same 1–10 system used for the static stain repellency tests. Again, it will be noted that the maximum rating after adding the results of the water borne stains will be 30, and similarly 30 will be the total results regarding the oil borne stains. These two may be added together.

By rating both the initial static stain repellency and the launderability, a complete picture can be obtained not possible when only the intial strain reaction is determined.

In the following examples cotton swatches were prepared as in Example I and sprayed with 1,3-hexafluoroxylene as the solvent plasticizer with or without an additive as indicated in the results set forth in the table on this page. The tests were conducted in accordance with the Colgate-Palmolive test produce mentioned in the above. The adjuvant when employed was in the amount of 0.5% based on the weight of the solvent while the weight of the total curing composition was about equal to the fabric.

What is claimed is:

1. A method for developing oil and water repellency in connection with a substrate which has been treated with a fluorocarbon polymer selected from the group consisting of polymeric acrylates and methacrylates of hydroxyl compounds containing a highly fluorinated residue and chromium coordination complexes of saturated perfluoro monocarboxylic acids applied to said substrate, wherein the improvement comprises further treating the treated substrate with a composition containing a liquid which is a solvent for said fluorocarbon polymer, said liquid being selected from the group consisting of unsymmetrical trichlorotrifluoroethane, 1,3-hexafluoroxylene, trifluorotoluene and tetrahydrofuran and an adjuvant selected from a group consisting of aromatic alcohols, aliphatic esters, aromatic esters and essential oils having the property of retarding evaporation of the solvent.

2. A method of claim 1 wherein said liquid solvent is 1,3-hexofluoroxylene.

3. The method of claim 2 wherein the polymer is a polyfluoroalkylacrylate.

4. The method of claim 1 wherein the adjuvant is selected from the group consisting of terpeneol, phenylethanol, amyl salicylate and benzyl acetate.

5. The method of claim 1 wherein the substrate is a fibrous material.

6. The method of claim 1 wherein the quantity of the solvent employed is up to about equal to the substrate by weight while the additive employed is about up to 5% by weight of the solvent.

7. The method of claim 4 wherein the adjuvant is terpeneol.

8. The method of claim 4 wherein the adjuvant is phenylethanol.

9. The method of claim 4 wherein the adjuvant is amyl salicylate.

10. The method of claim 4 wherein the adjuvant is benzyl acetate.

| Example | Sprayed with 100% 1,3 Hexafluoroxylene and .5% Additive (when present) based on Weight of Fabric | Colgate-Palmolive Test | | | | | |
|---|---|---|---|---|---|---|---|
| | | Repellency | | | Launderability | | |
| | | W.B. | O.B. | Total | W.B. | O.B. | Total |
| | | Maximum Rating | | | | | |
| | | 30 | 30 | 60 | 30 | 30 | 60 |
| III | Dryer Dried | 5 | 6 | 11 | 13 | 6 | 19 |
| IV | Dryer Dried and Ironed 176 sec./ft.² 350° F | 23 | 13 | 36 | 27 | 8 | 35 |
| V | Dryer Dried and Solvent Cured without Additive | 27 | 20 | 47 | 29 | 24 | 53 |
| VI | Dryer Dried and Solvent Cured with Phenylethanol | 29 | 29 | 58 | 30 | 29.5 | 59.5 |
| VII | Dryer Dried and Solvent Cured with Terpeneol | 30 | 29.5 | 59.5 | 30 | 30 | 60 |
| VIII | Dryer Dried and Solvent Cured with Amyl Salicylate | 30 | 30 | 60 | 30 | 30 | 60 |
| IX | Dryer Dried and Solvent Cured with Benzyl Acetate | 27 | 25.5 | 52.5 | 30 | 26.5 | 56.5 |

W.B.=Water borne; O.B.=Oil borne.

References Cited

UNITED STATES PATENTS 2,277,941 3/1942 Almy _____ 36—77
2,642,416 6/1953 Ahlbrecht et al. _____ 260—83.5
2,803,615 8/1957 Ahlbrecht et al. _____ 260—29.6

WILLIAM D. MARTIN, Primary Examiner

THEODORE G. DAVIS, Assistant Examiner

U.S. Cl. X.R.

117—139.5, 143, 161